United States Patent [19]

Ross et al.

[11] Patent Number: 4,897,249

[45] Date of Patent: Jan. 30, 1990

[54] BARIUM BORATE PREPARATION

[75] Inventors: Sidney D. Ross, Williamstown; Manuel Finkelstein, North Adams, both of Mass.

[73] Assignee: Sprague Electric Company, North Adams, Mass.

[21] Appl. No.: 332,316

[22] Filed: Apr. 3, 1989

[51] Int. Cl.$^4$ ............... C01B 35/12; C01B 15/12; C04B 35/46; C04B 35/48
[52] U.S. Cl. ............... 423/280; 423/279; 501/137; 501/139
[58] Field of Search ............... 423/279, 280; 501/137, 501/139

[56] References Cited

U.S. PATENT DOCUMENTS 4,683,126  7/1987  Inoue et al. ............... 423/280
4,766,027  8/1988  Burn ............... 427/44

FOREIGN PATENT DOCUMENTS 220950  4/1985  German Democratic Rep. .
47-21397  10/1972  Japan ............... 423/280

OTHER PUBLICATIONS

Chemical Abstracts, vol. 103, No. 26, 216382u, Metal Borates by Direct Conversion of Oxides or Hydroxides of Metals.
Chemical Abstracts, vol. 74, No. 24, 131090e, Physicochemical Study of a Barium Hydroxide-Boric Acid Water System at 30°.
E. M. Levin and H. F. McMurdie, "The System BaO—B$_2$O$_3$", J. Am. Ceram. Soc. 32, 99 (1949).
O. Yamaguchi, K. Tominaga and K. Shimizu, "Formation and Transformation of Alkoxy-Derived BaB$_2$O$_4$" Ceramurgia Int., vol. 6(3), pp. 103–105 (1980).

*Primary Examiner*—Robert L. Stoll
*Assistant Examiner*—Lori F. Cuomo

[57] ABSTRACT

A filtered solution of barium hydroxide octahydrate reacted with an aqueous solution of boric acid to provide hydrated $\gamma$ barium borate having a barium to boron ratio of 1:2 and having fine particle size. The hydrated $\gamma$ barium borate was converted to the anhydrous $\gamma$ form at about 300° to 400° C. Further heating to about 600° to 800° C. converted the product to $\beta$-BaB$_2$O$_4$. The conversion to the $\beta$-form is preferably during sintering of a ceramic dielectric composition to which the $\gamma$-BaB$_2$O$_4$ has been added as a flux.

2 Claims, No Drawings

BARIUM BORATE PREPARATION

BACKGROUND OF THE INVENTION

This invention relates to the preparation of barium borate of a fixed barium to boron ratio for use in ceramic dielectric compositions, and more particularly to such a barium borate for use as a flux in barium titanate dielectric compositions for ceramic capacitors.

Barium borate ($BaB_2O_4$) is used in some barium titanate ceramic formulations as a flux so as to lower the sintering temperature and maximize the density of the ceramic. $BaB_2O_4$ is usually added in amounts of approximately 2% of the total ceramic composition. The effectiveness of $BaB_2O_4$ as a flux is strongly dependent on the barium to boron ratio. Only with strict control of this ratio can reliably reproducible results be guaranteed.

Barium borate has been prepared in the prior art: by the solid state reaction of boric acid with either barium nitrate or barium carbonate; by the reaction of boric acid with barium chloride; by the simultaneous hydrolysis of barium and boron alkoxides; and, by the reaction of barium chloride with borax. None of these prior art preparative procedures guarantees stoichiometry control and none assures that the product will be uniquely $BaB_2O_4$, with a Ba to B ratio of 1:2.

Attempts to control the barium to boron ratio of barium borate to 1:2 by pyrolyzing crystalline organic precursors have not been successful. Boric acid is known to form coordination compounds from appropriately substituted diols and hydroxy substituted diols and hydroxy substituted carboxylic acids. However, recrystallization and pyrolytic decomposition of several of the more promising organic compounds (viz: barium boro-di-salicylate; barium-boro-di-O,O'-biphenolate trihydrate; barium boro-tri-2,3-naphathalenediolate trihydrate; barium boro-di-pyrocatecholate trihydrate) failed to provide $BaB_2O_4$. In all four cases the product obtained was contaminated by the presence of trace amounts of $Ba_2B_2O_2$, in which the Ba to B ratio is 1:1 rather than 1:2, probably due to volatilization of some boron as an organo-boron compound during the pyrolysis. In addition the pyrolysis always left some residue of unoxidized carbon in the product.

SUMMARY OF THE INVENTION

In accordance with this invention, barium borate having the barium to boron ratio of 1:2 was obtained by reacting an aqueous solution of boric acid with a barium hydroxide compound and precipitating the reaction product. The reaction of boric acid with barium hydroxide octahydrate in water provided the $\gamma$-form of $BaB_2O_4$ directly, and provided that product with complete control of the desired stoichiometry and with considerable control over the particle size of the product as well. As originally obtained by precipitation from boiling water the $BaB_2O_4$ product is hydrated and this water of hydration is not completely removed by air drying at 120°. By heating at either 300° C. or 400° C. this hydrated $\gamma$-$BaB_2O_4$ was converted to the anhydrous product, and by further heating at temperatures of 600°–800° the $\gamma$-form was quantitatively converted to $\beta$-$BaB_2O_4$.

DESCRIPTION OF THE PREFERRED EMBODIMENTS

Barium hydroxide octahydrate ($Ba(OH)_2 8H_2O$) (200 g; 0.634 mole) was boiled with 1 liter of distilled water, and the insoluble solid was filtered off by gravity using Whatman #1 filter paper. This filtration effectively separated the insoluble barium carbonate that was present from the soluble barium hydroxide.

An aliqout of the filtrate was titrated with 0.1N hydrochloric acid, and the solution was found to contain 0.6075 mole of barium hydroxide. A hot solution of boric acid (75.12 g; 1.215 mole) in 600 ml. of distilled water was poured rapidly into the hot, stirred filtrate, and a white precipitate formed. After standing overnight at room temperature the white solid was filtered with suction and dried at 120° C. to a constant weight. The yield of dried product was 126 g.

The titration of the barium hydroxide solution used in the preparation of $BaB_2O_4$ above is tedious. In many experiments the titer consistently fell between 94% and 96% of the weighed barium hydroxide. It is possible to assume that the starting hydroxide contains only 5% of insoluble barium carbonate and 95% of the soluble barium hydroxide. This makes it possible to omit the titration. This simplification can be further justified, since the solubility of $\gamma$-$BaB_2O_4$, compared to boric acid and barium hydroxide, is such that only $\gamma$-$BaB_2O_4$ will precipitate even when either boric acid or barium hydroxide is in excess when the two aqueous solutions are mixed. These fortuitous solubility relationships, therefore, guarantee stoichiometry control during this preparation of $\gamma$-$BaB_2O_4$.

In illustration of the above we cite an experiment in which a large excess of barium hydroxide was used. Barium hydroxide octahydrate (50 g.; 0.1585 mole) was boiled with 250 ml. of distilled wter. The solution was filtered through Whatman #1 filter paper, and the solid on the filter paper was washed with an additional 25 ml. of hot distilled water. Assuming the presence of 95% hydroxide this solution should provide 0.1506 mole of barium hydroxide. A hot solution of boric acid (11.54 g; 0.1867 mole) in 75 ml. of distilled water was added to the above barium hydroxide. This represents an enormous excess of barium hydroxide, since 0.1506 mole of the hydroxide would require 0.3012 mole of boric acid rather than 0.1867 mole of boric acid actually used for complete conversion of the barium hydroxide to $\gamma$-$BaB_2O_4$. When worked up as described in the first preparative procedure, the experiment yielded 17.7 g. of $\gamma$-$BaB_2O_4$, with stoichiometry maintained at 1 Ba to 2 B.

Both $\gamma$-$BaB_2O_4$ and $\beta$-$BaB_2O_4$ have characteristic infrared spectra, which may be used for purposes of identification. A more precise and more detailed structural identification comes from powder X-ray diffraction studies which distinguishes $\gamma$-$BaB_2O_4$ from $\beta$-$BaB_2O_4$ and both of these products from other members of the system $BaO$—$B_2O_3$.

Additional and unexpected benefit of the above described preparative procedure results from the facts that the solubility relationships and rates of crystal growth and crystal precipitation are such that the product is obtained in fine particle size and with a narrow particle size distribution. The documentation for these assertions is in the form of electron micrographs and X-ray diffraction patterns.

We note finally that it is a real benefit that the product as initially precipitated is slightly hydrated $\gamma$-$BaB_2O_4$, and that the dehydrated $\gamma$-$BaB_2O_4$ can be obtained by heating at 300°–400° C. For use as a flux in ceramic formulations it is really not necessary to calcine at 600°–800° C. to convert $\gamma$-$BaB_2O_4$ to $\beta$-$BaB_2O_4$. The γ-form can be used directly in the ceramic formulation, since the final firings will be at temperatures well in excess of 800° C., and conversion of the γ-form to the β-form will take place during that treatment.

We claim:

1. A process for preparing barium borate, said process consisting essentially of obtaining a purified filtrate of soluble barium hydroxide by boiling barium hydroxide octahydrate in water and filtering off any insoluble material, reacting an aqueous solution of boric acid with said purified barium hydroxide compound in boiling water, precipitating the reaction product of hydrated γ-$BaB_2O_4$ having a barium to boron ratio of 1:2 from said water, converting the hydrated product to anhydrous γ-$BaB_2O_4$ at 300° to 400° C., and converting the anhydrous product to β-$BaB_2O_4$ at 600° to 800° C.

2. The process of claim 1 wherein said converting of said anhydrous product to β-$BaB_2O_4$ takes place during sintering of a barium titanate dielectric composition in which said anhydrous γ-$BaB_2O_4$ is present as a flux.

* * * * *